United States Patent [19]

Hehl

[11] Patent Number: 4,473,346
[45] Date of Patent: Sep. 25, 1984

[54] MECHANISM FOR THE ATTACHMENT OF INTERCHANGEABLE MOLDS IN AN INJECTION MOLDING MACHINE

[76] Inventor: Karl Hehl, Arthur-Hehl-Strasse 32, 7298 Lossburg 1, Fed. Rep. of Germany

[21] Appl. No.: 449,550

[22] Filed: Dec. 13, 1982

[30] Foreign Application Priority Data

Dec. 11, 1981 [DE] Fed. Rep. of Germany ....... 3149103
Apr. 8, 1982 [DE] Fed. Rep. of Germany ....... 3213209

[51] Int. Cl.³ .......................................... B29F 1/022
[52] U.S. Cl. .................................. 425/183; 425/185; 425/186; 425/190; 425/192 R
[58] Field of Search ............... 425/183, 185, 186, 542, 425/190, 192 R

[56] References Cited

U.S. PATENT DOCUMENTS 4,202,522 5/1980 Hanas ............................. 425/185 X
4,348,165 9/1982 Vostrovsky .................... 425/190 X

OTHER PUBLICATIONS

Engel-information A-67-TV-9/81, Ludwig Engel KG, Austria, (circular supplied by applicant).

Primary Examiner—Thomas P. Pavelko
Attorney, Agent, or Firm—Joseph A. Geiger

[57] ABSTRACT

A mechanism for the clamping attachment of interchangeable injection molding dies to the die carrier plates of an injection molding machine featuring a plurality of clamping plungers in axial guide bores of the die carrier plates, each clamping plunger having a clamping nose engaging a clamping shoulder of an oversized back plate of the die half, clamping the latter against the die carrier plate, when it is forcibly retracted by means of a transversely guided wedge rod traversing the clamping plunger and driven by a hydraulic cylinder assembly in a self-locking taper drive configuration. The injection molding dies are insertable and removable in either a horizontal or a vertical direction.

17 Claims, 4 Drawing Figures

MECHANISM FOR THE ATTACHMENT OF INTERCHANGEABLE MOLDS IN AN INJECTION MOLDING MACHINE

BACKGROUND OF THE INVENTION

1. Field of the Invention

The present invention relates to injection molding machines and, more particularly, to a hydraulic mechanism for the clamping attachment of interchangeable injection molding dies to the die carrier plates of the die closing unit of an injection molding machine.

2. Description of the Prior Art

An important factor in the cost of injection molding is the machine downtime and the skilled labor which are required in conjunction with the changeover from one injection molding die to another. This cost element becomes more important, as production runs become shorter. Shorter production runs, on the other hand, make it possible to reduce product inventory costs.

It has therefore already been suggested to at least partially mechanize the removal of interchangeable injection molding dies from the die closing unit of an injection molding machine. An important element of this mechanization is the precise and reliable clamping attachment of the two die halves to the stationary and movable die carrier plates of the die closing unit.

One such attachment mechanism is disclosed in "Kunststoffe" Vol. 70 (1980) Issue 3, pp. 128-131 and in the circular "Engel-Information" A-67-TV-9/81 of the Ludwig Engel KG, 4311 Schwertberg, Austria. This prior art mechanism features four axially oriented clamping pins which are bolted to the back side of each die half, so as to be engageable into matching positioning bores of the associated stationary or movable die carrier plate. Each axial positioning bore is intersected by a radial inside which is guided a wedge member which is extendable and retractable by means of a hydraulic actuator. Each positioning pin has a transverse bore with an inner drive taper which cooperates with an outer taper of the wedge member, so that the latter, when advanced into the bore, creates a clamping traction on the clamping pin. The wedge taper may be such that the wedge member and the clamping pin create a self-locking action.

The need for clamping pins which extend from the back plates of the die halves represents a disadvantge, inasmuch as the insertion of the injection molding die requires a much greater opening of the die closing unit, as would be the case without the clamping pins. Accordingly, the injection molding die has to be held in alignment with the die carrier plates, while the latter are approached for engagement of the clamping pins into the positioning bores.

A similar arrangement is suggested in U.S. Pat. No. 4,116,599, where each die half carries two axially extending clamping pins which reach through the associated die carrier plate into engagement with transversely sidable wedge members which are arranged on the back side of the die carrier plate. This configuration may make it necessary to insert each die half separately, when the overall axial length of the closed injection molding die exceeds the maximum plate opening of the die closing unit.

An additional shortcoming of the these prior art attachment mechanism relates to the fact that an element of positioning inaccuracy is present, due to the need for a certain engagement clearance between the clamping pins and the positioning bores. Within this clearance, the die halves may be displaced out of alignment by the action of the wedge members on the clamping pins.

It is also known to provide injection molding dies with oversize back plates of standardized dimensions, in line with a trend to apply building block principles to the manufacture of injection molding dies. Standardized back plates are listed in 'Normalien für Formwerkzeuge', Katalog K 400 Europa-Reihe of Firma Sustan, Frankfurt, Germany, and EOC-Normalien of EO-Cummernel KG, Lüdenscheid, Germany. Oversize back plates are also disclosed in U.S. Pat. No. 2,398,893.

Another prior art suggestion for a mechanized clamping of the die halves to the die carrier plates involves the use of clamping claws which are rotatably supported on the die carrier plates and which engage an oversize back plate of each die half through rotation and a subsequent axial clamping movement. This mechanism requires a comparatively complex actuating drive, and it has the additional disadvantage of making it impossible to use a self-locking action in the clamped position, due to the need for rotating the clamping claw. The absence of a self-locking action constitutes a risk factor, inasmuch as a hydraulic failure of the actuating drive could cause considerable damage to the injection molding die and to the die closing unit.

SUMMARY OF THE INVENTION

Underlying the present invention is the primary objective of devising an improved mechanism for the attachment of interchangeable injection molding dies which does not have the earlier-described shortcomings and which produces a reliable clamping attachment, without the need for opening the injection molding die or closing the die carrier plates against the die halves during the die attachment procedure.

The present invention proposes to attain this objective by suggesting a mechanism for the clamping attachment of interchangeable injection molding dies to the die carrier plates of the die closing unit which features at least two axially movable clamping plungers in each die carrier plate, in guide bores which are located diametrally opposite to the center axis of the die closing unit, which clamping plungers have forwardly protruding extremities in the shape of a clamping nose with a rearwardly facing clamping face engaging clamping shoulders of the die halves.

In order to provide such clamping shoulders on the die halves, the invention further suggests the attachment of a standardized back plate to each die half which is radially larger than the latter, so as to form protruding flange portions. These radially protruding flange portions have the clamping shoulders on their forward sides and guide faces on their radially outer sides. The flange portions reach into lateral recesses of the clamping plungers behind their clamping noses.

This novel configuration allows for the insertion and removal of the injection molding die between die carrier plates which are in sliding contact, or near-contact, with the back plates of the injection molding die. The advantages of this novel die insertion procedure are twofold: the die carrier plates serve to axially position and guide the injection molding die during insertion, and the clamping plungers can be actuated immediately following the insertion movement, without moving the die carrier plates in the axial direction.

The novel die attachment mechanism of the invention further suggests retracting means for the clamping plungers which include a transverse bore in each plunger engaged by a wedge rod which is driven by a double-acting hydraulic cylinder. Matching tapers in the transverse bore of the clamping plunger and on the wedge rod produce an elevated pluger retraction force with a self-locking effect, thus preventing accidental release of the injection molding die in the case of depressurization of the hydraulic cylinders.

By arranging the tapers of the clamping plunger and wedge rod in such a way that the latter has to be pulled, in order to retract the clamping plunger, the highest force output of the double-acting hydraulic cylinder can be applied to the release of the wedge rod from its self-locking position.

In order to produce a forward extension of the clamping plungers, when the wedge rods execute a release movement, the invention further suggests the arrangement of a compression spring in a blind axial bore of the clamping plunger which bears against the wedge rod by means of a release pin, thereby subjecting the clamping plunger to a forward bias. The same axial bore is conveniently also used to supply lubricant to the tapered friction surfaces of the clamping plunger and wedge rod through a suitable lubrication fitting.

The invention also suggests the arrangement of simple guide bars on the die carrier plate which support the injection molding die during horizontal insertion, and the provision of abutment pins which stop the insertion movement in the centered position of the injection molding die.

The proposed die attachment mechanism has the advantage of making it impossible for the clamping plungers to transmit radial forces to the die halves of the injection molding die, during their attachment to the die carrier plate. This is not the case with the earlier-mentioned prior art devices, which are subject to alignment distortions caused by the action of the wedge members.

Another advantage of the present invention resides in the fact that the purely radial insertion movement of the injection molding die lends itself to the automatic coupling of the die with its fluid supply and fluid return lines and to the automatic uncoupling, when the die is removed from the die closing unit. This features requires a standardization of the supply line couplings on the interchangeable injection molding dies.

The arrangement of the clamping members to remain inside the die carrier plates, in contrast to the prior art suggestion of attaching clamping pins to each injection molding die, in addition to greatly reducing the number of special parts required, has the further advantage of allowing for the wedge rods to remain in permanent engagement with the clamping plungers, with the result that the displacements of the wedge rods and the dimensions of the hydraulic cylinder assemblies are considerably reduced. The invention proposes to arrange these hydraulic cylinder assemblies on the horizontal upper and lower sides of the die carrier plates, thereby minimizing the space requirements of the die attachment mechanism and facilitating the use of the building block principle in connection with die closing units of different size.

BRIEF DESCRIPTION OF THE DRAWINGS

Further special features and advantages of the invention will become apparent from the description following below, when taken together with the accompanying drawings which illustrate, by way of example, a preferred embodiment of the invention which is represented in the various figures as follows.

DESCRIPTION OF THE PREFERRED EMBODIMENT

Figure 1:
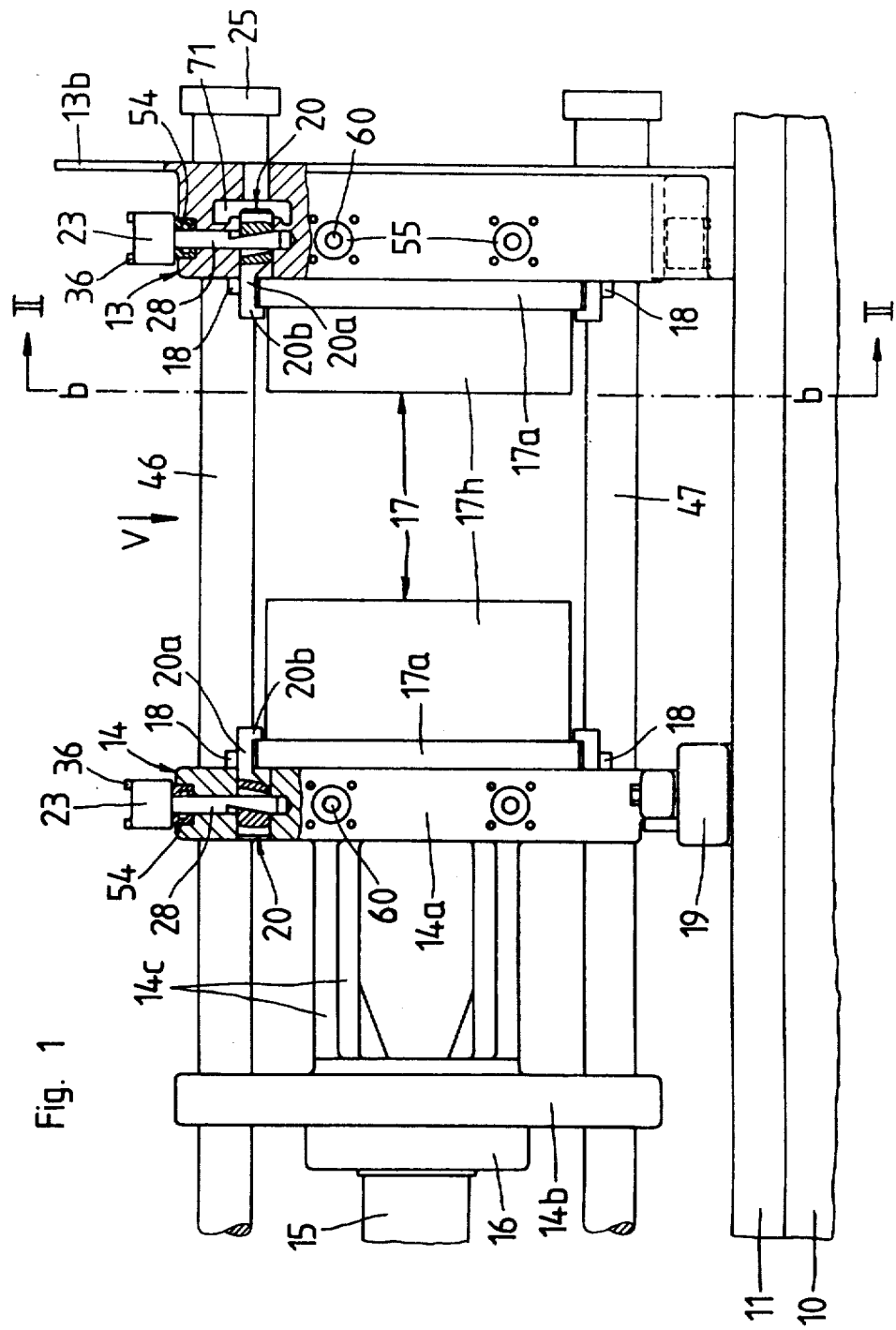
FIG. 1 shows a push-type die closing machine of an injection molding machine with partially cross-sectioned die carrier plates incorporating an embodiment of the die attachment mechanism of the present invention.
Figure 2:
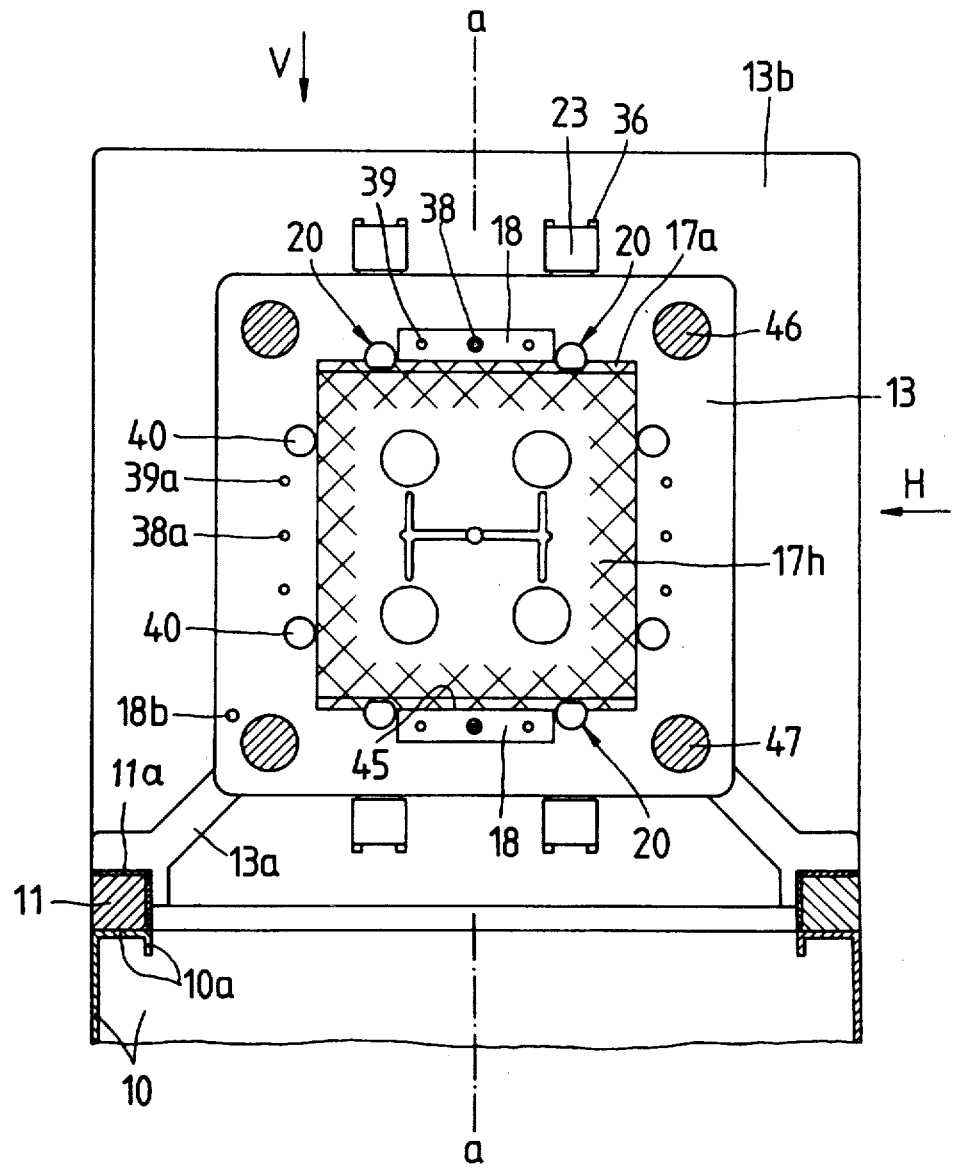
FIG. 2 is a cross-sectional axial view of the die closing unit of FIG. 1, the cross section being taken along line II—II thereof.

FIGS. 1 and 2 of the drawings show a push-type die closing unit which is mounted on a machine base 10 which is reinforced with two parallel guide rails 11. The guide rails 11 are welded to edge formations 10a of the machine base 10 and carry hardened angled runway strips 11a. The entire die closing unit is supported and centered on the two guide rails 11.

The die closing unit consists essentially of a stationary die carrier plate 13, a likewise stationary cylinder head plate, not shown in the drawing, four parallel tie rods which are rigidly bolted to the stationary die carrier plate 13 and to the cylinder head plate, and a movable die carrier plate 14 which is guided for die opening and closing movements along the tie rods 46 and 47.

The die opening and closing movements are produced by a hydraulic actuator assembly, likewise not shown, which is attached to the cylinder head plate and has a piston rod 15 connected to the die carrier plate 14. The movable die carrier plate 14 is part of a movable die carrier frame which consists of a pressure transfer wall 14b, a die mounting wall 14a, the horizontal pressure transfer ribs 14c which serve as stiffening members. A base plate 16 connects the piston rod 15 to the pressure transfer wall 14b. The weight of the movable die carrier frame is supported directly on the guide rails 11 by means of special guide assemblies 19 which ride on the runway strips 11a.

The stationary die carrier plate 13 has two diagonally extending mounting struts 13a with which it rests on the guide rails 11. A large rectangular reinforcing shield 13b circumscribes the die carrier plate 13. The stationary cylinder head plate (not shown) has similar mounting struts and a similar reinforcing shield. The two upper tie rods 46 and the two lower tie rods 47 are fitted into bores of these two stationary plates and axially clamped to these plates by means of special clamping devices 25.

FIG. 1 shows an injection molding die 17 consisting of two die halves 17h, mounted in the die closing unit. The stationary die carrier plate 13 carries a stationary die half 17h, and the movable die carrier plate 14 carries a movable die half 17h. In terms of the present invention, which relates to the attachment of the die halves 17h to the two die carrier plates 13 and 14, it is of no consequence whether the carrier plate and the attached die half are stationary or movable. It should be understood, therefore, that all the references to a die carrier plate and to a die half which do not specifically indicate the stationary or movable state, apply equally to both.

Figure 3:
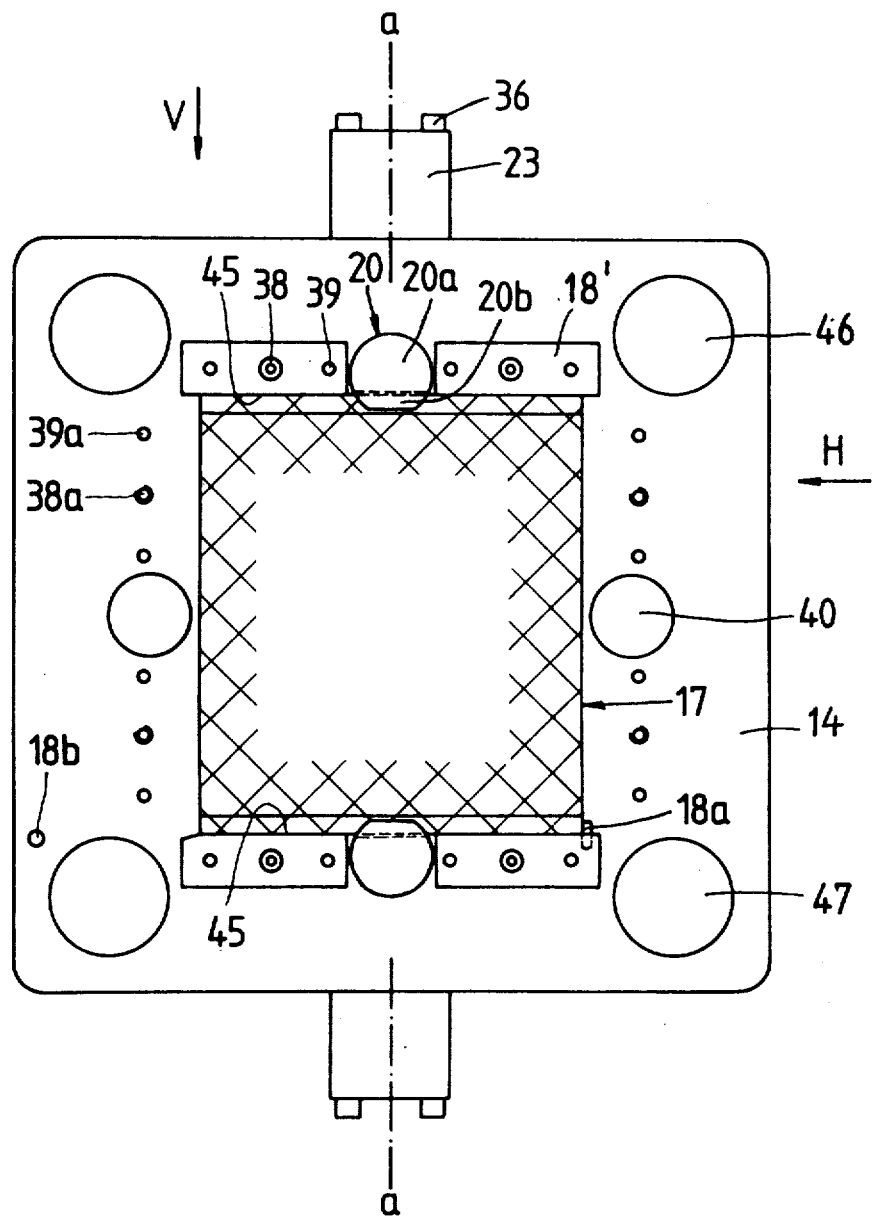
FIG. 3 represents an enlarged cross-sectional view of the die closing unit which is similar to FIG. 2, while featuring a modified arrangement of the mechanism of the invention.
Figure 4:
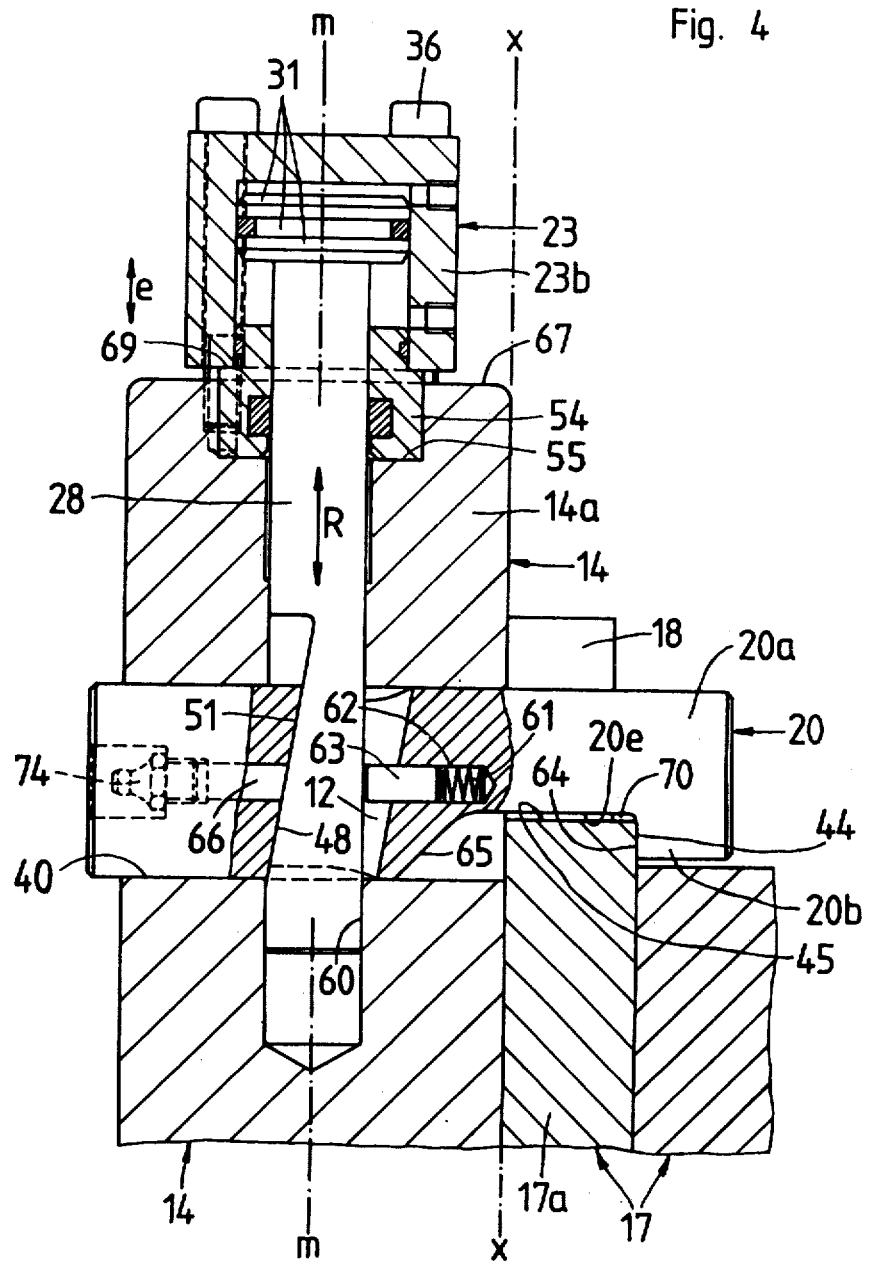
FIG. 4 shows a greatly enlarged detail of the die attachment mechanism of FIG. 1.

In each die carrier plate are arranged four or two clamping plungers 20, as can be seen in FIG. 2 or FIG. 3, respectively. The clamping plungers 20 are received in axial guide bores 40 in the die carrier plates 13 and 14 which are located diametrally opposite the center axis of the die closing unit and in the vicinity of the edges of the injection molding die. For an injection molding die 17 which is to be inserted and removed in a horizontal direction, the clamping plungers 20 are arranged above and below the horizontal upper and lower edges of the die halves 17h.

In order to obtain a clamping engagement between the clamping plunger 20 and the die halves 17h, the latter have standardized back plates 17a which exceed the regular dimensions of the die halves 17h on at least those sides on which the clamping plungers 20 are located. The back plates 17a thus form radially outwardly protruding flange portions defining forwardly facing clamping shoulders 44 on diametrally opposite sides of each die half 17h. The flange portions of the back plates 17a reach into lateral recesses 70 in the forwardly protruding extremities 20a of the clamping plungers 20. The recesses 70 define a clamping nose 20b on the protruding extremities 20a with rearwardly facing clamping faces 64 cooperating with the clamping shoulders 44 of the back plates 17a.

While the cooperating clamping shoulders 44 of the die back plates 17a and the clamping faces 64 of the clamping plungers are preferably oriented radially, it should be understood that these faces and shoulders could also be inclined to obtain a wedging action. In all cases, however, the axial projection of the clamping plungers 20, at their protruding extremities 20a, and of the back plates 17a of the die halves overlap to produce a clamping engagement, when the clamping plungers 20 are retracted in the direction of the die carrier plate 13 or 14.

The proposed clamping attachment configuration makes it possible to obtain a die clamping action with a minimal axial displacement of the clamping plungers 20, in the order of one or two milimeters. With the clamping plungers 20 in a released position, in which their clamping faces 64 are a small distance removed from the clamping shoulders 44 of the back plates 17a, the die halves 17h are slidable radially along the mounting faces of the two die carrier plates 13 and 14, for the insertion or removal of an injection molding die 17. During this sliding movement, the protruding flange portions of the back plates 17a moves through the lateral recesses 70 of the clamping plungers 20 with a small clearance to the bottom 20e of the recess 70.

The die halves 17h are guided during the insertion and removal of the injection molding die by means of horizontal guide bars 18—vertical guide bars in the case of vertical insertion and removal—which are attached to the die carrier plates 13 and 14 and which bear against guide faces 45 on the outer sides of the back plates 17a. While FIGS. 2 and 3 show both upper and lower guide bars 18 and 18', respectively, it should be understood that, due to the weight of the injection molding die, it may suffice to use only lower guide bars 18 or 18'.

The lower guide bars 18 or 18' also serve to center the die halves 17h in relation to their die carrier plates 13 and 14 in the vertical sense. Centering in the horizontal sense is achieved by means of abutment pins 18a (FIG. 3) which are anchored in the guide bars 18'. These pins stop the back plate 17a of the die in the horizontally centered position. Alternately, the horizontal centering may be provided by a power-driven die insertion device which stops its movement in the correct position.

The invention thus makes it possible to insert and remove an injection molding die in its closed position, without requiring axial displacements of the movable die carrier plate 14 and/or of the injection molding die itself in relation to the stationary die carrier plate 13. While it is possible to remove an injection molding die from between the die carrier plates, when the latter contact the back plates 17a of the die without pressure, it is normally preferable to have the axial distance between the die carrier plates 13 and 14 exceed the axial width of the closed injection molding die 17 by approximately 0.5 mm.

The clamping action between the clamping plunger 20 and the die half 17h is obtained by forcibly retracting the clamping plunger in the direction of the die carrier plate 13 or 14. For this purpose, each clamping plunger 20 interacts with a transversely guided wedge rod 28 which engages a transverse bore 12 in the guided rear portion of the clamping plunger 20. The wedge rod 28 is an integral extension of the piston rod of a hydraulic cylinder assembly 23 which is mounted on the upper or lower side 67 of the die carrier plate 13 or 14, in perpendicular alignment with the clamping plunger 20.

The transverse bore of the clamping plunger 20 and the wedge rod 28 have cooperating matching tapers 48 and 51, respectively, which are inclined in relation to the center axis m-m of the wedge rod 28, so as to produce a plunger retracting action, when the wedge rod 28 is pulled radially outwardly by the hydraulic cylinder assembly 23. The angle of inclination of the tapered friction surfaces 48 and 51 is preferably equal to smaller than the release angle, so that a self-locking effect is produced and axial forces acting on the clamping plunger 20 will not displace the wedge rod 28, even in the case of an accidental depressurization of the hydraulic cylinder assembly 23.

The comparatively small taper angle also means that it is possible to obtain an elevated clamping force with a comparatively small piston 31 executing a piston stroke e which, even though a multiple of the plunger retraction stroke, is still comparatively small, i.e., approximately one-third of the diameter of the clamping plunger 20. On the other hand, this configuration produces an axial clamping plunger 20 which is a multiple of the force applied to the wedge rod 28 by the cylinder assembly 23. These small actuation strokes and compact hydraulic controls are possible, thanks to the arrangement of the clamping plungers 20 in the die carrier plates in a clamping configuration in which they require only very axial displacements.

The wedge rod 28 is guided on opposite sides of its taper 51 in the guide bore 60 and, in the area of the opening of the guide bore 60, by an guide bushing 54. The latter has a portion received in a recess 55 on the outer side 67 of the die carrier plate. The guide bushing 54 also serves as a cover for the pot-shaped cylinder 23b, centering and positioning the latter by means of a centering collar and shoulder 69. Screws 36 in the four corners of the cylinder 23b clamp the latter against the guide bushing 54.

In order to obtain a release movement of the clamping plunger 20, the latter carriers a release spring 61 in a blind axial bore 62, the spring 61 being compressed to bear against the wedge rod 28 by means of a release pin 63. The release spring 61 assures that, when the wedge rod 28 moves radially inwardly, the tapered friction face 48 of the clamping plunger 20 remains in contact with the tapered friction face 51 of the wedge rod, as the clamping plunger 20 moves outwardly from the die carrier plate 13 or 14. The blind bore 62 also serves as a lubrication channel 66 for the tapered friction surfaces 48 and 51, having a lubrication fitting 74 in its rearward opening.

The wedge rod 28 remains permanently engaged in the transverse bore 12 of the clamping plunger 20, thereby securing the latter against rotation. It should be understood that the inclination of the cooperating tapers 48 and 51 of the clamping plunger 20 and wedge rod 28 could also arranged in such a way that a pushing displacement of the wedge rod 28 produces a retraction of the clamping plunger 20. However, in view of the self-locking action of this drive, it is preferable to have the greater hydraulic force of the double-acting cylinder assembly 23 applicable to the release movement of the wedge rod 28.

As can be seen in FIGS. 2 and 3, the clamping plungers 20 and their hydraulic drives can be reoriented for a vertical insertion and removal of the injection molding die. For this purpose, the die carrier plates 12 and 14 have appropriate guide bores 40 for the relocation of the clamping plungers 20, as well as pin bores 39a and threaded bores 38a for the pins 39 and screws 38 which attach the guide bars 18 or 18', respectively, to the die carrier plates. In the configuration for vertical insertion and removal, the lower horizontal guide bars 18 support the inserted but not yet attached die halves 17h in centered alignment with the die carrier plates 13 and 14.

While the clamping plungers 20 of the drawings are shown in a preferred shape in which the clamping nose 20b does not protrude over the cylindrical outline of the clamping plunger 20, this is not a prerequisite for the application of the invention. Accordingly, it is also possible to define the clamping faces 44 of the clamping plungers 20 by means of axially adjustable nuts which are seated on the forward extremities of the clamping plungers. These clamping plungers would not require a lateral recess, in order to accommodate the outwardly protruding flange portions of the back plates 17a.

It should be understood, of course, that the foregoing disclosure describes only a preferred embodiment of the invention and that it is intended to cover all changes and modifications of this example of the invention which fall within the scope of the appended claims.

I claim the following:

1. A mechanism for the clamping attachment of interchangeable injection molding dies to the die carrier plates of an injection molding machine, which machine has a die closing unit defining a horizontal center axis and including a stationary and a movable die carrier plate with radially oriented parallel opposite die mounting faces for the attachment thereto of a stationary and a movable die half, the movable die carrier plate being guided on a plurality of horizontal tie rods and driven for opening and closing movements along said center axis, the die attachment mechanism comprising in combination:

at least two axially movable clamping plungers arranged in each die carrier plate in axial guide bores which are located diametrally opposite to the center axis of the die closing unit, the clamping plungers having forward extremities protruding a distance from the die mounting faces of the associated die carrier plates;

a standardized back plate on the axially outer side of each die half, the back plate having an outer face adapted to be clamped to the die mounting face of the corresponding die carrier plate and radial dimensions which permit radial insertion and retraction of the back plate between the protruding extremities of said oppositely located clamping plungers, in a movement in which the outer face of the back plate moves along the die mounting face of the die carrier plate with minimal clearance, thereby making it possible to insert and attach a closed injection molding die, without the need for axially moving the die carrier plates;

means defined by the back plates of the die halves and by the associated clamping plungers for clamping each back plate to the die mounting face of the corresponding die carrier plate, when the clamping plungers are retracted in the direction of the die mounting plate; and means for forcibly retracting the clamping plungers in the direction of the die mounting plate so as to operate said back plate clamping means.

2. A die attachment mechanism as defined in claim 1, wherein the back plate clamping means includes forwardly facing clamping shoulders on the periphery of each back plate and radially inwardly projecting clamping noses with rearwardly facing clamping faces on the protruding forward extremities of the clamping plungers, the clamping faces of the clamping plungers bearing against the clamping shoulders of the back plate, when the clamping plunger retracting means is actuated to operate the back plate clamping means.

3. A die attachment mechanism as defined in claim 2, wherein the die halves define a generally rectangular outline with their radial dimensions; and the back plates are likewise of generally rectangular outline, exceeding the radial dimensions of the die halves on at least those sides on which they cooperate with clamping plungers to define said back plate clamping means, the back plates thereby forming radially protuding straight flange portions with radial clamping shoulders, with the result that the clamping noses of the clamping plungers will transmit only axial clamping forces to the die halves.

4. A die attachment mechanism as defined in claim 2, wherein the clamping plungers have a generally cylindrical shape, and the protruding forward extremities of the clamping plungers have a radial recess to the rear of the clamping nose, so that the clamping nose of each clamping plunger is encompassed within its cylindrical outline.

5. A die attachment mechanism as defined in claims 3, wherein the claimping plungers have a generally cylindrical shape, and the protruding forward extremities of the clamping plungers have a radial recess to the rear of the clamping nose, so that the clamping nose of each clamping plunger is encompassed within its cylindrical outline; and the protruding flange portions of the back plates reach into the radial recesses of the clamping plungers.

6. A die attachment mechanism as defined in claim 1, further comprising means for radially guiding the injection molding die in relation to the die carrier plates during insertion and removal of the die; and means for centering the injection molding die in relation to the die carrier plates at the end of the die insertion movement.

7. A die attachment mechanism as defined in claim 6, wherein the die guiding means includes horizontal guide bars on the two die carrier plates engaging radially downwardly facing guide faces of the two back plates of the die from underneath, so as to support and guide the die during insertion and removal in a horizontal radial direction.

8. A die attachment mechanism as defined in claim 7, wherein the die centering means includes abutment members on the two die carrier plates cooperating with the two back plates of the die, so as to stop the horizontal die insertion, when the die has reached its centered position.

9. A die attachment mechanism as defined in claim 6, wherein the die guiding means includes vertical guide bars on the two die carrier plates engaging radially outwardly facing guide faces of the two back plates of the die from opposite radial sides, so as to guide the die during insertion in a vertical direction; and the die centering means includes abutment members on the two die carrier plates cooperating with the two back plates of the die, so as to support the injection molding die in its vertically centered position.

10. A die attachment mechanism as defined in claim 1, wherein the clamping plunger retracting means includes a transverse bore in a rear portion of each clamping plunger, a wedge rod extending at right angles to each clamping plunger and reaching through the transverse bore of the latter, and means for forcibly moving the wedge rod in both axial directions; and the wedge rod and the transverse bore of the clamping plunger have matching tapers which cooperate to translate an axial displacement of the wedge rod into a much smaller retracting displacement of the clamping plunger, while applying to the latter a retraction force which is correspondingly greater than the axial force applied to the wedge rod.

11. A die attachment mechanism as defined in claim 10, wherein the means for moving the wedge rod includes a double-acting hydraulic cylinder assembly; and the hydraulic cylinder assembly includes a piston rod which also serves as the wedge rod.

12. A die attachment mechanism as defined in claim 11, wherein the wedge rod is guided in a wedge rod bore in the die carrier plate; and the hydraulic cylinder assembly further includes a guide bushing which is recessed into the wedge rod bore, so as to protrude in part from the outer side of the die carrier plate, and a pot-shaped hydraulic cylinder which is axially clamped against a centering shoulder on the protruding portion of the guide bushing.

13. A die attachment mechanism as defined in claim 10, wherein the clamping plunger retracting means further includes a release spring biasing the clamping plunger in the direction of extension from the die carrier plate, in opposition to said plunger retraction force.

14. A die attachment mechanism as defined in claim 13, wherein the clamping plunger has an axial blind bore extending from is rearward extremity a distance beyond its transverse bore;

the release spring is a compression spring, engaging the bottom of said blind bore with one extremity and bearing against the wedge rod with its other extremity through the intermediate of a release pin; and the clamping plunger further includes a lubrication fitting in the rearward opening of said blind bore.

15. A die attachment mechanism as defined in claim 10, wherein the matching tapers of the wedge rod and of the transverse bore in the clamping plunger are so inclined to the axis of the wedge rod that a pulling displacement of the wedge rod creates a retracting displacement of the clamping plunger.

16. A die attachment mechanism as defined in claim 10, wherein the angle included between the taper of the wedge rod and its center axis is smaller than the angle of response of the cooperating tapers of the wedge rod and transverse bore in the clamping plunger, with the effect of producing a self-locking interaction between the clamping plunger and the wedge rod.

17. A die attachment mechanism as defined in claim 1, wherein the interchangeable injection molding dies have a rectangular outline in the radial sense, being adapted for insertion between the die carrier plates in a horizontal radial direction;

the back plates of the two die halves likewise have a rectangular radial outline, exceeding the radial height of the associated die halves to form radially upwardly and downwardly protruding flange portions with forwardly facing clamping shoulders as part of the back plate clamping means, said flange portions having guide faces on their radially outer sides;

each die carrier plate has two upper and two lower clamping plungers arranged to cooperate with the upper and lower flange portions of a back plate, the back plate clamping means further including radially inwardly projecting clamping noses with rearwardly facing clamping faces on the protruding forward extremities of the clamping plungers, the clamping faces of the clamping plungers bearing against the clamping shoulders of said back plate, when the clamping plunger retracting means is actuated to operate the back plate clamping means; and the die attachment mechanism further comprises horizontal guide bars on the two die carrier plates engaging the guide faces of the downwardly protruding flange portions of the corresponding back plates, so as to support the injection molding die during insertion and removal.

* * * * *